United States Patent [19]

Takahashi et al.

[11] Patent Number: 5,382,556

[45] Date of Patent: Jan. 17, 1995

[54] TRANSLUCENT POLYCRYSTALLINE ALUMINA AND PROCESS FOR PRODUCING THE SAME

[75] Inventors: Hiroshi Takahashi, Osaka; Hiroshi Umezaki; Yasushi Teshima, both of Ehime, all of Japan

[73] Assignee: Sumitomo Chemical Company, Limited, Osaka, Japan

[21] Appl. No.: 50,564

[22] Filed: Apr. 21, 1993

[30] Foreign Application Priority Data

Apr. 22, 1992 [JP] Japan .................................. 4-102855

[51] Int. Cl.⁶ .............................................. C04B 35/10
[52] U.S. Cl. ..................................... 501/153; 501/105
[58] Field of Search ................................. 501/153, 105

[56] References Cited

U.S. PATENT DOCUMENTS

| | | | |
|---|---|---|---|
| 3,026,210 | 3/1962 | Coble | 501/153 |
| 4,285,732 | 8/1981 | Charles et al. | 501/153 X |
| 4,629,593 | 12/1986 | Groh et al. | 501/153 X |
| 4,633,137 | 12/1986 | Scott et al. | 313/636 |
| 4,725,467 | 2/1988 | Groh et al. | 501/153 X |
| 4,797,238 | 1/1989 | Rhodes et al. | 264/65 |

FOREIGN PATENT DOCUMENTS 0110248  6/1984  European Pat. Off. .
0134277  3/1985  European Pat. Off. .
3201750  9/1982  Germany .

OTHER PUBLICATIONS

Baikowski International Corporation 1981 "Baikowski Ceramic Aluminas" Ceramic Industry, May 1986 High-Purity Alumina Made in the U.S.A.
G. Toda et al. "Effects of $Y_2O_3$ and MgO Addition on Transmittance of Sintered $Al_2O_3$".
J. G. J. Peelen (1976) Philips tech. Rev. 36:47-52.

*Primary Examiner*—Karl Group
*Assistant Examiner*—David R. Sample
*Attorney, Agent, or Firm*—Birch, Stewart, Kolasch & Birch

[57] ABSTRACT

Translucent polycrystalline alumina made of aluminum oxide containing magnesium oxide in an amount of larger than 0.01% by weight and less than 0.03% by weight, zirconium oxide in an amount of larger than 0.01% by weight and less than 0.06% by weight and calcium oxide in an amount of less than 0.001% by weight, all based on the weight of aluminum oxide, which alumina has good light transmittance and mechanical strength.

6 Claims, 2 Drawing Sheets

TRANSLUCENT POLYCRYSTALLINE ALUMINA AND PROCESS FOR PRODUCING THE SAME

BACKGROUND OF THE INVENTION

1. Field of the Invention

The present invention relates to translucent polycrystalline alumina and a process for producing the same. More particularly, the present invention relates to polycrystalline alumina having improved light transmission and mechanical strength and a process for producing the same.

2. Description of the Related Art

U.S. Pat. No. 3,026,210 discloses translucent alumina and a process for producing the same, which process comprises adding 0.5% by weight or less of magnesium oxide to high purity alumina fine powder and sintering the mixture at a temperature of 1750° to 1950° C. in a hydrogen gas atmosphere. Further, Japanese Patent Publication No. 6831/1984 discloses a process for increasing a solubility of magnesium oxide in alumina by the addition of zirconium oxide or hafnium oxide to the high purity alumina fine powder in addition to the magnesium oxide.

According to the invention disclosed in the above Japanese Patent Publication, alumina containing at least 80% by weight of α-alumina is used, and about 0.03 to 0.15% by weight of magnesium oxide and about 0.002 to 0.07% by weight of zirconium oxide or about 0.003 to 0.07% by weight of hafnium oxide are added to alumina, and the mixture is molded and calcined at a temperature of about 1750° to 1950° C. in a hydrogen gas atmosphere, whereby the amount of magnesium oxide is not substantially decreased during calcination.

As is well known, the presence of magnesium oxide will accelerate elimination of pores from grain boundaries of alumina in a sintering step and suppress abnormal growth of grains, whereby uniform crystalline grains are formed. If magnesium oxide is not present or its amount is too small, no polycrystalline alumina having good light-transmission is obtained.

When an excess amount of magnesium oxide is added to alumina, a spinel phase consisting of magnesium aluminate is formed on the grain boundaries of alumina grains, so that the light transmission of alumina is decreased.

It is known that added magnesium oxide is dissipated and decreased in the high temperature calcination step, and the dissipation rate depends on various parameters such as the shape of the molded material, the heating rate, the holding time, and the size or shape of the sintering furnace. Thus, it is very difficult to control the process parameters in the commercial production of translucent alumina.

Since R. L. Coble introduced the light transmission property of polycrystalline alumina, many improvements have been proposed. When the translucent polycrystalline alumina is used in an application such as an arc tube of a sodium discharge lamp, only a slight improvement of light transmission of polycrystalline alumina causes improvement in the luminance of the sodium-discharge lamp and increases the commercial value of such lamp greatly. Accordingly, polycrystalline alumina having higher light transmission is still required. In addition, when the lamp is on or off, the tube may be broken by thermal shock, polycrystalline alumina having high strength.

SUMMARY OF THE INVENTION

One object of the present invention is to provide polycrystalline alumina having improved light transmission and mechanical strength.

Another object of the present invention is to provide a process for producing polycrystalline alumina having improved light transmission and mechanical strength.

According to a first aspect of the present invention, there is provided translucent polycrystalline alumina comprising aluminum oxide containing magnesium oxide in an amount of larger than 0.01% by weight and less than 0.03% by weight, zirconium oxide in an amount of larger than 0.01% by weight and less than 0.06% by weight and calcium oxide in an amount of less than 0.001% by weight, all based on the weight of aluminum oxide.

According to a second aspect of the present invention, there is provided a process for producing the translucent polycrystalline alumina of the present invention, the process comprising steps of:

molding a mixture of 100 parts by weight of aluminum oxide powder having a purity of at least 99.9% and an average particle size of not larger than 1 μm and containing calcium oxide or a compound which forms calcium oxide by calcination in an amount of less than 0.001% by weight in terms of calcium oxide; larger than 0.01 parts by weight to less than 0.03 parts by weight (in terms of magnesium oxide) of magnesium oxide or a compound which forms magnesium oxide by calcination; and larger than 0.01 parts by weight to less than 0.06 parts by weight (in terms of zirconium oxide) of zirconium oxide or a compound which forms zirconium oxide by calcination, calcining the molded material in air at a temperature of from 800° to 1200° C. and sintering the calcined material in vacuum or in a hydrogen gas atmosphere at a temperature of from 1600° to 1950° C.

The polycrystalline alumina of the present invention and the polycrystalline alumina prepared by the process of the present invention consists of relatively uniform crystalline grains having an average grain size of from about 10 μm to about 40 μm and containing substantially no abnormally grown grain, namely no coarse grain having a size of 100 μm or larger, and has good light transmission, namely an in-line transmission at a wavelength of 600 nm of at least 30%, preferably at least 32%, and good mechanical strength, namely a three-point bending strength of larger than 20 kg/mm², preferably at least 25 kg/mm².

DETAILED DESCRIPTION OF THE INVENTION

Figure 1:
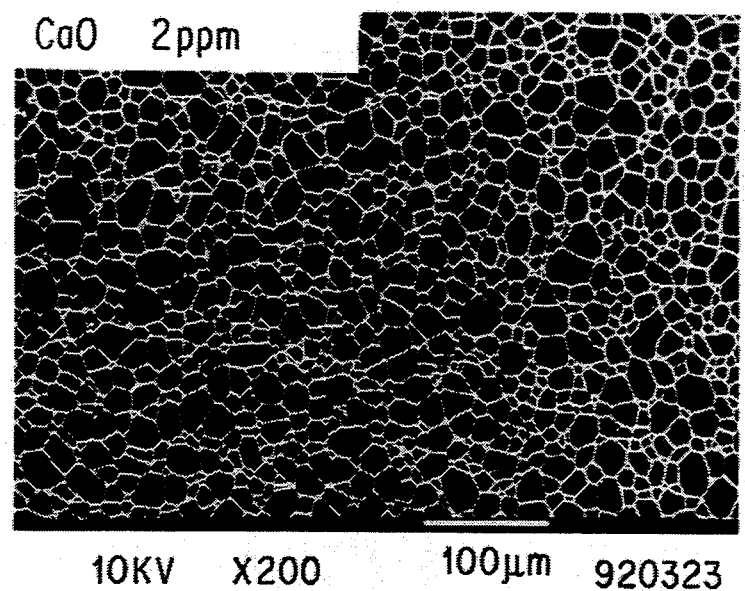
FIG. 1 is a photomicrograph of a sintered body of polycrystalline alumina having the composition of the present invention.

The translucent polycrystalline alumina of the present invention contains magnesium oxide in an amount of larger than 0.01% by weight and less than 0.03% by weight, preferably larger than 0.015% by weight and less than 0.030% by weight and most preferably not larger than 0.025 by weight; zirconium oxide in an amount of larger than 0.01% by weight and less than 0.06% by weight, preferably from 0.015 to 0.05% by weight; and calcium oxide in an amount of less than 0.001% by weight, preferably 0.0005% by weight or less, all based on the weight of aluminum oxide.

When the amount of magnesium oxide in aluminum oxide is 0.01% by weight or less or 0.03% by weight or larger, the sintered body of polycrystalline alumina has no good light transmission.

When the amount of zirconium oxide is 0.01% by weight or less, again the sintered body of polycrystalline alumina has no good light transmission.

When the amount of zirconium oxide is 0.06% or larger, abnormally grown grains tend to appear and the sintered body of polycrystalline alumina has decreased strength.

When the amount of magnesium oxide is larger than the above range according to the present invention, a sintered body of polycrystalline alumina having high light transmission may be obtained because of the presence of abnormally grown grains due to zirconium oxide. However, such sintered body has decreased strength.

When the amount of calcium oxide is 0.001% by weight or larger, the abnormally grown grains appear and the sintered body has decreased strength.

Alumina to be used as a raw material in the present invention may be prepared by hydrolysis of an organic aluminum compound, the modified Bayer method, pyrolysis of ammonium alum, pyrolysis of ammonium dorsonite and the like, has the purity of at least 99.9% and contains calcium impurities in an amount of less than 0.001% by weight in terms of calcium oxide. Preferably, alumina has a BET specific surface area of 1 to 70 $m^2/g$, and can be $\alpha$-alumina, or a mixture of $\alpha$-alumina with at least one intermediate alumina such as $\gamma$-alumina, $\delta$-alumina, $\theta$-alumina, $\eta$-alumina, $\chi$-alumina or $\kappa$-alumina. Insofar as alumina satisfies the above essential properties, the preparation process is not critical. In general, alumina powder which is prepared by the hydrolysis of an organic aluminum compound containing a very small amount of calcium oxide is used.

To add magnesium oxide or zirconium oxide as the additive, inorganic or organic precursors (a compound which forms the oxide by calcination) of magnesium or zirconium can be used, while magnesium oxide or zirconium oxide can be directly used. Any precursor that forms the corresponding oxide in the calcination step of alumina and leaves no contamination material may be used. Examples of the precursor are hydroxides, hydrochlorides, carbonates, nitrates and stearate salts of magnesium and zirconium.

The alumina powder, magnesium oxide or its precursor and/or zirconium oxide or its precursor are ground and mixed to homogeneously disperse them. The grinding and mixing may be carried out by any of conventionally used methods or apparatuses, such as ultrasonic dispersion, jet mill, pin mill, ball mill, vibration mill, or medium agitation mills (e.g. pearl mill, sand mill, dynomill, ultraviscomill, attriter, annular mill, etc.). The grinding and mixing can be carried out in a wet or dry manner. In view of good dispersibility, the wet medium agitation mills are preferred.

As a grinding medium used in the medium agitation mill, alumina beads or zirconia beads having a diameter of about 0.2 to 5 mm, preferably about 0.3 to 2 mm are preferably used.

When the alumina beads are used as the grinding medium, contamination of calcium from the beads should be taken care of. In general, the commercially available alumina beads contain 0.005 to 2% by weight of calcium oxide depending on the grade of aluminum beads. When the high purity alumina powder containing substantially no calcium is ground with such alumina beads, it is not unusual that the alumina powder is contaminated with several ppm to several ten ppm of calcium.

When the zirconia beads are used as the grinding medium, abrased zirconium oxide (zirconia) powder from the zirconia beads in the grinding step or the subsequent mixing step is incorporated in the alumina powder. Such zirconium oxide powder can be used as the zirconium oxide additive to be contained in the polycrystalline alumina of the present invention. The incorporated amount of the abrased zirconium oxide can be estimated by preliminary testing.

When zirconium oxide is added and mixed in the alumina powder by the above procedure, no calcium oxide is incorporated in the alumina powder, while the zirconium oxide powder is homogeneously dispersed in the alumina powder.

A treating time of the alumina powder in the grinding step depends on the method or apparatus to be used, the kind of grinding medium, grinding conditions, etc. In general, the treating time is from about 10 minutes to about 50 hours, preferably from about 30 minutes to about 10 hours.

An average grain size of the alumina composition after grinding is measured by a microtrack method and usually at most 1 $\mu$m, preferably at most 0.8 $\mu$m. Preferably, a content of the grains having the grain size of 1 $\mu$m or larger is 30% by weight or less.

A slurry after the wet grinding is usually filtrated and dried by any of conventional methods, preferably by spray drying.

For spray drying, it is possible to add a viscosity modifier (e.g. polycarboxylate salts, naphthalenesulfonate salts, etc.), a binder (e.g. polyvinyl alcohol, acrylic resins, vinyl acetate resins, etc.), a lubricant (e.g. waxes, stearic acid, etc.), a plasticizer (e.g. glycerol, ethylene glycol, etc.) and the like to the slurry. When the magnesium oxide or zirconium oxide raw material is supplied in a liquid form (e.g. a dispersion), it can be added to and mixed with the slurry at this stage.

The alumina powder containing magnesium oxide or its precursor and zirconium oxide or its precursor can be molded in a desired shape by any of conventional molding methods such as press molding, extrusion molding, injection molding, cast molding and the like.

The obtained molded article is calcined in air at a temperature of from 800° to 1200° .C to remove any impurity that will have adverse affects on the light transmission of alumina such as a molding aid or water, and then sintered in vacuum or in a hydrogen gas atmosphere at a temperature of from 1600° to 1950° C. Optimum sintering conditions depend on the kind or size of the sintering furnace, the molding method, or the shape or size of the molded article and can be determined by preliminary testing.

In the sintered body of polycrystalline alumina prepared by the method of the present invention, the contents of magnesium and zirconium present therein are not substantially decreased from those in the raw materials. That is, when calcium oxide or a compound which forms calcium oxide by calcination is contained in an amount of less than 0.001% by weight in terms of calcium oxide, magnesium oxide or a compound which forms magnesium oxide by calcination is used in an amount of larger than 0.01 parts by weight to less than 0.03 parts by weight (in terms of magnesium oxide) and zirconium oxide or a compound which forms zirconium oxide by calcination is contained in an amount of larger than 0.01 parts by weight to less than 0.06 parts by weight (in terms of zirconium oxide) per 100 parts by weight of alumina, it is possible to obtain translucent polycrystalline alumina comprising aluminum oxide containing magnesium oxide in an amount of larger than 0.01% by weight and less than 0.03% by weight, zirconium oxide in an amount of larger than 0.01% by weight and less than 0.06% by weight and calcium oxide in an amount of less than 0.001% by weight, all based on the weight of aluminum oxide.

The polycrystalline alumina having the above composition has a uniform texture having an average grain size of about 10 to 40 $\mu$m and contains substantially no abnormally grown grain, and provides a sintered body having excellent light transmission and mechanical strength, which is particularly advantageous in an optical application such as the arc tube of the sodium discharge lamp.

PREFERRED EMBODIMENTS OF THE INVENTION

The present invention will be illustrated by the following Examples which do not limit the scope of the present invention. In Examples, "parts" and "%" are by weight unless otherwise indicated.

EXAMPLE 1

One hundred parts of $\alpha$-alumina which was prepared by hydrolysis of the organic aluminum compound and had a purity of 99.99% (content of calcium oxide: <2 ppm), an average particle size of 0.8 $\mu$m, a content of particles having a particle size of 1 $\mu$m or larger of 31% and a BET specific surface area of 4.5 m$^2$/g, 43 parts of water and 0.5 part of an organic dispersant (ammonium polycarboxylate) were mixed and wet ground in a dynomill (an internal volume of 1.4 liters, manufactured by Willy A. Bachofen AG). As the grinding medium, zirconia beads having a diameter of 0.6 mm (4 kg) were used. After grinding, the alumina powder had the BET specific surface area of 4.6 m$^2$/g and the average particle size of 0.7 $\mu$m and contained 17% of particles having a particle size of 1 $\mu$m and 0.04% of zirconium oxide.

Then, to the wet ground alumina powder, 0.02% (in terms of MgO) of magnesium nitrate was added and spray dried to obtain granules.

The granules were press molded under pressure of 1.5 ton/cm$^2$ to obtain a disc pellet having a thickness of 1.5 mm and a diameter of 20 mm. The pellet was calcined in an electric furnace at 900° C. for 3 hours in the air and then sintered in a hydrogen atmosphere furnace at 1800° C. for 6 hours.

The analysis of the composition of sintered body revealed that the alumina contained 180 ppm of magnesium oxide, 360 ppm of zirconium oxide and 2 ppm of calcium oxide.

The both surfaces of the sintered body were polished with a diamond slurry and its thickness was adjusted to 0.85 mm. Using the spectrometer U-2000 manufactured by Hitachi Limited (a light source: an iodine-tungsten lamp, a detector: a silicon diode), light having a light source spot diameter of 5.5 mm and a wavelength of 600 nm was incident on the sintered body and a transmission (in-line transmission) was measured. The result is shown in the Table.

The mechanical strength of the sintered body was measured by the three-point bending test according to JIS R1601-1981 and found to be 35 kg/cm$^2$.

EXAMPLES 2-6 and Comparative Examples 1-8

In the same manner as in Example 1 except that an amount of zirconia beads and the grinding time in the grinding step of the raw material alumina were changed to adjust the content of zirconium oxide in the alumina powder and the amount of magnesium oxide was adjusted by changing the amount of magnesium nitrate to be added, the aluminum raw material powder having the composition shown in the Table was prepared. In Example 4 and Comparative Example 3, the amount of calcium oxide was adjusted by adding calcium nitrate when the addition of magnesium oxide was added. In Comparative Examples 7 and 8, alumina beads were used in place of the zirconia beads in the grinding step.

From the ground raw material alumina powder, a sintered body was produced in the same manner as in Example 1, and its light transmission was measured. The results are shown in the Table.

The mechanical strength of each of the sintered bodies produced in Examples 3 and 4 aid Comparative Examples 3, 5 and 6 and found to be 35 kg/mm$^2$ in Example 3, 30 kg/mm$^2$ n Example 4, 20 kg/mm$^2$ in Comparative Example 3, 15 kg/mm$^2$ in Comparative Example 5 and 15 kg/mm$^2$ in Comparative Example 6.

Figure 2:
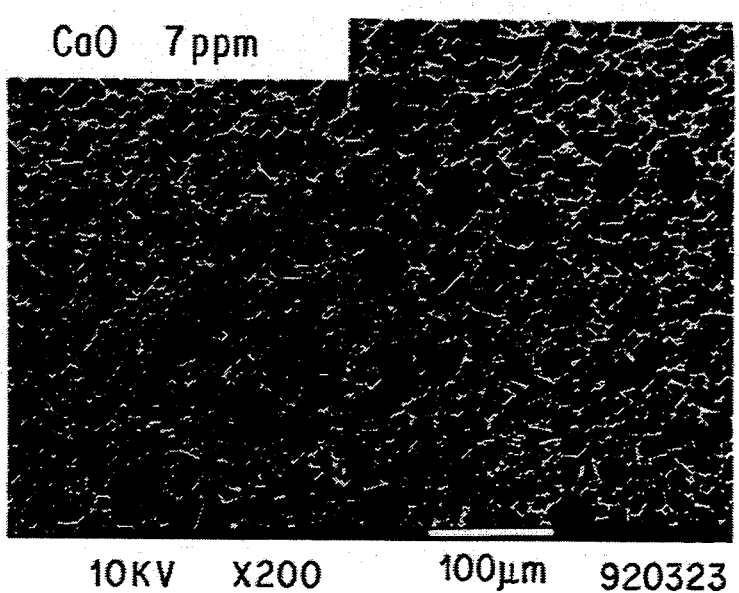
FIG. 2 is a photomicrograph of a sintered body of polycrystalline alumina containing 7 ppm of calcium oxide.
Figure 3:
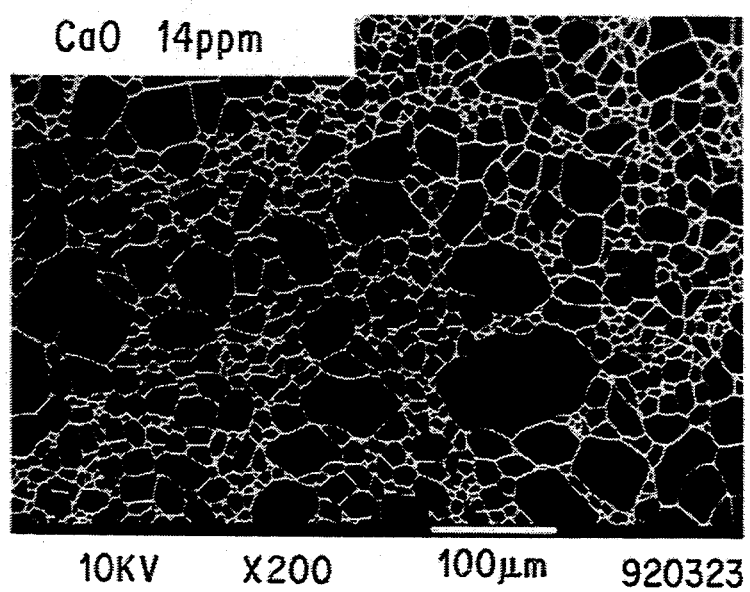
FIG. 3 is a photomicrograph of a sintered body of polycrystalline alumina containing 14 ppm of calcium oxide.

In order to observe the influence of calcium oxide on the texture of the sintered body, photomicrographs of the sintered bodies produced in Examples 1 and 4 and Comparative Example 3 were taken and are shown in FIGS. 1, 2 and 3, respectively.

EXAMPLE 7

In the same manner as in Example 1 except that high purity alumina balls having a diameter of 2 mm were used as the grinding medium in place of the zirconia beads, the alumina powder was ground. The ground alumina powder had the BET specific surface area of 4.7 m$^2$/g and the average particle size of 0.7 $\mu$m and contained 28% of the particles having a particle size of 1 $\mu$m or larger.

Then, to the wet ground alumina powder, 0.04% (in terms of ZrO$_2$) of a ZrOCl$_2$ solution and 0.02% (in terms of MgO) of Mg(NO$_3$)$_2$ solution were added and spray dried to obtain granules.

The granules were press molded under pressure of 1.5 ton/cm$^2$ to obtain a disc pellet having a thickness of 1.5 mm and a diameter of 20 mm. The pellet was calcined in an electric furnace at 900° C. for 3 hours in the air and then sintered in a hydrogen atmosphere furnace at 1800° C. for 6 hours.

The analysis of the composition of sintered body revealed that the alumina contained 180 ppm of magnesium oxide, 360 ppm of zirconium oxide and 3 ppm of calcium oxide.

The both surfaces of the sintered body were polished with a diamond slurry and its thickness was adjusted to 0.85 mm, and its in-line transmission was measured in the same manner as in Example 1. The result is shown in the Table.

The mechanical strength (three-point bending strength) of the sintered body was 35 kg/cm$^2$.

TABLE

| Example No. | Content in alumina powder (ppm) | | | In-line transmission (%) |
| --- | --- | --- | --- | --- |
| | ZrO$_2$ | MgO | CaO | |
| 1 | 400 | 200 | 2 | 38 |
| 2 | 400 | 150 | 2 | 35 |
| 3 | 400 | 250 | 2 | 39 |
| 4 | 400 | 200 | 7 | 36 |
| 5 | 150 | 200 | 2 | 35 |
| 6 | 500 | 200 | 2 | 35 |
| 7 | 400 | 200 | 3 | 34 |
| C. 1 | 400 | 50 | 2 | 25 |
| C. 2 | 400 | 350 | 2 | 30 |
| C. 3 | 400 | 200 | 14 | 37 |
| C. 4 | 50 | 200 | 2 | 30 |
| C. 5 | 650 | 200 | 2 | 24 |
| C. 6 | 1500 | 500 | 2 | 36 |
| C. 7 | 0 | 500 | 2 | 25 |
| C. 8 | 0 | 100 | 2 | 25 |

What is claimed is:

1. Translucent polycrystalline alumina having an in-line transmission at a wavelength of 600 nm of at least 30% comprising aluminum oxide containing magnesium oxide in an amount of larger than 0.01% by weight but not larger than 0.025% by weight, zirconium oxide in an amount of larger than 0.01% by weight and less than 0.06% by weight and calcium oxide in an amount of less than 0.001% by weight, all based on the weight of aluminum oxide, wherein said translucent polycrystalline alumina has a three-point bending strength of at least 25 kg/mm$^2$.

2. The translucent polycrystalline alumina according to claim 1, which contains magnesium oxide in an amount of larger than 0.015% by weight and less than 0.025% by weight; zirconium oxide in an amount of from 0.015 to 0.05% by weight; and calcium oxide in an amount of 0.0005% by weight or less, all based on the weight of aluminum oxide.

3. The translucent polycrystalline alumina of claim 1 wherein the alumina is in the form of uniform grains having an average grain size of from 10 μm to about 40 μm.

4. The alumina of claim 3 which contains substantially no grain having a size of 100 μm or larger.

5. The alumina of claim 4 which has an in-line transmission at a wavelength of 600 nm of at least 32%.

6. The alumina of claim 4 which has a three-point bending strength of 35 kg/cm$^2$.

* * * * *